United States Patent Office 3,152,999
Patented Oct. 13, 1964

3,152,999
STABLE ORGANO SILOXY-ALUMINUM OXIDE POLYMERS AND PROCESS OF PRODUCING SAME
John B. Rust and Hideyo H. Takimoto, Los Angeles, Calif., assignors to Hughes Aircraft Company, Culver City, Calif., a corporation of Delaware
No Drawing. Filed May 31, 1960, Ser. No. 32,540
5 Claims. (Cl. 260—2)

The present invention relates to polymers containing an ordered arrangement of silicon and aluminum atoms, especially siloxy-aluminum oxide polymers containing regularly ordered repeating units of aluminum and oxygen atoms along the polymer chain, and a method of making such polymers.

The prior art describes aluminum oxide polymers, all of which suffer from poor hydrolytic stability. For instance, a mixed isopropoxy stearyloxy aluminum may be carefully hydrolyzed to form:

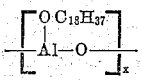

This polymer can readily undergo further hydrolysis to form $Al_2O_3$ which is useless as a film forming material or molding or laminating compositions. Another prior art disclosure describes a product formed by heating a compound, such as aluminum isopropoxide with a carboxylic acid, such as stearic acid to form:

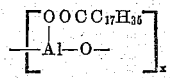

Here again the polymer readily undergoes hydrolysis to form $Al_2O_3$. Furthermore, both the $OC_{18}H_{37}$ and $OOCC_{17}H_{35}$ groups are not particularly thermally stable and the polymers, on heating, are ultimately converted into $Al_2O_3$ by elimination of, for instance, $C_{18}H_{37}OC_{18}H_{37}$, $(C_{17}H_{35}CO)_2O$ and the like.

Accordingly, it is an important object of this invention to provide polymers of high thermal stability and enhanced chemical stability to such influences as hydrolytic degradation.

Another object is to provide polymeric compositions which are useful as molding, laminating, and casting resins, as protective and insulating varnishes, as finishing agents to promote adhesion, and as adhesives and the like.

Additional objects will become apparent from the following description which is given primarily for purposes of illustration and not limitation.

We have now unexpectedly discovered that aluminum oxide polymers of outstanding thermal and hydrolytic stability can be formed from polymerizable intermediates containing triorganosubstituted siloxy side chains. It is important that these intermediates be made and isolated in substantially pure form since the character of the polymers prepared from them is critically dependent upon the purity of the intermediates.

The polymers of this invention can be prepared by several processes. The following intermediates, in substantially pure form, are preferred for the satisfactory preparation of our resinous compositions:

(a)                $(R_3SiO)Al(OR')_2$
(b)                $(R_3SiO)_2AlOR'$ where R and R' represent alkyl, aryl, aralkyl or mixed alkyl and aryl radicals. Thus R and R' can be methyl, ethyl, propyl, butyl, octyl, isopropyl, sec. butyl, and the like; or phenyl, tolyl, naphthyl, diphenyl, ethyl phenyl, etc.; or benzyl, methyl benzyl, α-phenyl ethyl, β-phenyl ethyl, α-phenyl propyl and the like. R' should preferably be a lower alkyl derivative, such as a methyl, ethyl, propyl, isopropyl, butyl, sec. butyl, and the like, radical.

The triorganosubstituted siloxy aluminum intermediates (a) and (b) can be prepared by any convenient means provided that substantially pure intermediates are produced or that a reaction mixture is obtained from which the substantially pure intermediate can be isolated. A satisfactory method of preparation is illustrated by the following reaction:

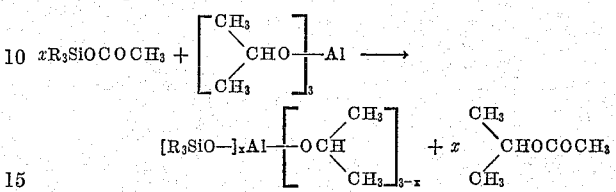

where $x$ is 1 or 2. This reaction is illustrated above for the case of a triorgano-substituted acetoxysilane and the case where R' is isopropyl. The reaction is equally satisfactory with other acylates and esters. It is desirable that the acylate and ester combination be chosen such that a fairly low boiling ester is produced or one that is readily removed by distillation under ambient or reduced pressure.

The polymers of the present invention can be prepared by the following three satisfactory methods, each of which can be used interchangeably, or any one of which can be utilized for the formation of polymers designed for a specific purpose. The following reactions typify the methods of preparation illustrated with intermediate (a):

I.

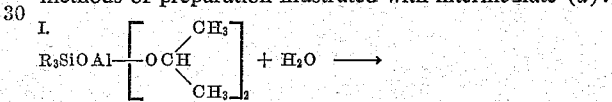

II.

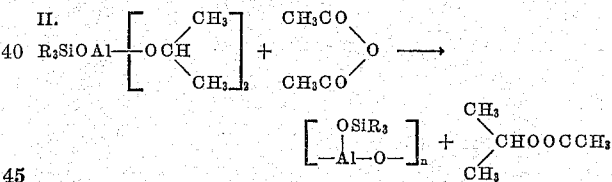

III.

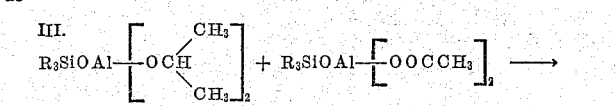

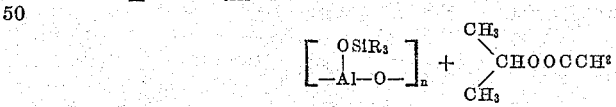

where $n$ is greater than unity and generally is quite high.

The polymers produced by the reactions illustrated above are essentially linear in nature and range in properties from liquids to thermoplastic solids depending upon the degree of polymerization and upon the character of the triorganosubstituted siloxy side chains. Intermediate (b) can be used in the above reaction as a chain growth limiter or an appropriate aluminum alkoxide can be used (which is trifunctional) to yield crosslinked polymers directly, if method I is employed, or potentially cross-linkable polymers if judicious use is made of methods II and III. In general, if method I is used, the polymer chains are terminated with —Al—OH groups, whereas with methods II and III they can be terminated with —Al—OR' or —Al—OOCR'' groups depending upon the stoichiometry of the reaction. In method II where the acid anhydride is used in excess, the polymer chains are terminated by acyloxy groups. In method III where the acylate is used in excess, the polymer chains are likewise terminated by acyloxy groups. However, where the alkoxide is used in excess, the polymer chains are terminated by alkoxy groups.

With methods II and III polymeric products can be formed which are capable of reacting in a convenient form with other resinous materials to form block and graft polymers. Furthermore, block polymers can be formed which are composed entirely of the polymers of the present invention. The following reactions involving method III illustrate in (1) the formation of aluminum oxide block polymers and in (2) the formation of regularly repeating aluminum oxide copolymers:

(1)
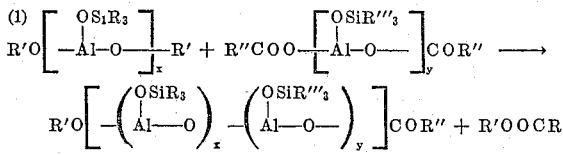

(2)
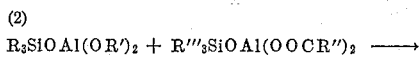

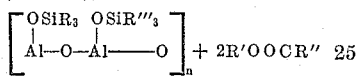

where R and R''' are different in both cases, and $x$ and $y$ are large numbers. R' and R'' should preferably contain less than about eight carbon atoms per radical so that the ester produced as a by-product of the polymerization reaction has sufficient volatility for removal from the product mixture by distillation at ambient or reduced pressure.

By utilizing methods I and II with mixtures of intermediate (a) with different R groups randomly repeating copolymers of aluminum oxide can be produced. In many cases we have found that the properties of the randomly repeating copolymers are different from those of the regularly repeating copolymers.

By means of method II, for instance, it is possible to produce polymers of this invention in the form of:

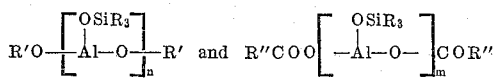

where $n$ and $m$ are greater than unity.

These products can be used to great advantage to modify a variety of resinous products to enhance their thermal properties, mechanical strength at elevated temperatures, weathering resistance, and the like. The end groups on the polymers of this invention are capable of reacting with alcohol and acid groups on resinous products, with phenolic hydroxyl groups, with esters by interchange with drying oil fatty acids, with silicone hydroxyl groups, with amine and epoxy groups as well as many other reactive sites on resinous product molecules.

The polymers of this invention alone, or in admixture with other resinous materials, such as phenolic-formaldehyde resins, alkyd resins, drying oil alkyd varnishes, silicone resins, epoxy resins and the like, to enhance their usefulness and especially their thermal stability, can be used as varnishes, lacquers and paints. They can be used as solvent solutions for these purposes or they may be milled with pigments and fillers, such as zinc oxide, titanium dioxide, iron oxide, powdered aluminum, and colored metallic salts, lakes, dyes and the like. The polymers may be employed as molding and laminating resins. In the case of laminating products the polymers of this invention may also be used as finishing agents for glass fibers to promote adhesion or secure a better bond between the glass fibers in the form of cloth, roving, yarn, chopped fibers and the like and another resinous binder.

The products of this invention possess unique properties which make them useful as thermally stable hydraulic, heat exchange and lubricating fluids, as thermoplastic compositions, as thermosetting resins, and as modifying resins for enhancing the thermal properties of well-known resinous compositions, such as silicone resins, drying oil alkyd resins, phenolic-formaldehyde resins, epoxy resins, and the like. When used as modifying resins they may be employed in simple admixture with materials with which they are compatible or the modification may be carried out under conditions which permit a chemical reaction to occur whereby the polymers of this invention become a chemical part of the modified resinous products. These modified resinous products then possess enhanced thermal properties and may be better utilized as varnishes, coating compositions, elastomers, molding compositions, laminating resins, insulating lacquers, and the like.

The resins of the present invention may be used for the preparation of both block and graft polymers possessing unique properties. Because the polymers of this invention consist essentially of inorganic aluminum oxide chains, block and graft copolymers formed with various organic polymers possess unexpected properties.

The following examples are given to illustrate the polymers and compositions of this invention. These examples are not to be construed as a limitation on the scope of this invention since this scope is specifically and correctly set forth in the claims.

The following examples are given to illustrate the materials and processes of the present invention. The first two examples illustrate procedures for the preparation of intermediates useful in the synthesis of the polymers of this invention.

EXAMPLE I

To 40.8 grams of triisopropoxyaluminum dissolved in 175 ml. of toluene, 26.4 grams of trimethylacetoxysilane was added. The clear solution was refluxed for five hours, after which time the condensation product, isopropyl acetate, and the solvent was removed by distillation. The residual material was fractionated under reduced pressure to give 22.5 grams of trimethylsiloxydiisopropoxyaluminum boiling at 122.5–124° C./4–5 mm. The viscous, oily, colorless liquid crystallized upon standing at room temperature for two days to a white solid which was extremely sensitive to moisture.

EXAMPLE II

Triisopropoxyaluminum (20.4 grams) and triphenylacetoxysilane (31.8 grams) were heated at 80° C. in 75 ml. of dry cumene for two hours. The theoretical amount of isopropyl acetate, as well as the bulk of the solvent, were then removed by heating under reduced pressure. On cooling to room temperature, the liquid residue in the flask crystallized and 31.5 grams of white waxy crystals was obtained. Upon further removal of residual solvent from the reaction mixture, a second crop of the crystals (8.0 grams) was recovered. The product, triphenylsiloxydiisopropoxyaluminum, decomposed upon exposure to atmospheric moisture.

EXAMPLE III

One mole of water was added slowly to one mole of trimethylsiloxydiisopropoxyaluminum dissolved in a mixture of toluene and isopropyl alcohol. An evolution of heat was observed and the reaction became cloudy as the water was added. The material was stirred for two hours at room temperature after which the volatile materials were removed by distillation. The resulting white solid was partially soluble in aromatic solvents. Prolonged heating of the product in air effected further cure and complete insolubilization.

EXAMPLE IV

An equimolar quantity of acetic anhydride was added slowly to trimethxysiloxydiisopropoxyaluminum dissolved in toluene. The solution became warm as the anhydride was added and a color change to pale yellow was observed. The condensation product, isopropyl acetate, and the solvent were removed by distillation after the mixture was stirred for three hours. A white solid soluble in toluene was obtained. This resin which exhibited excellent thermal stability was useful in coating, laminating and molding applications.

EXAMPLE V

To a mixture of 42.12 grams of trimethylsiloxydiisopropoxyaluminum and 5.28 grams of bis(trimethylsiloxy)-isopropoxyaluminum dissolved in 175 ml. of toluene, 38.76 grams of acetic anhydride was added slowly. An evolution of considerable amount of heat was observed. The clear solution was stirred for three hours. The isopropyl acetate and the solvent were then removed by distillation first at atmospheric pressure and later under vacuum. The residual product was a viscous material which did not increase appreciably in viscosity upon further heating. Prolonged heating under vacuum effected very little change in appearance of the polymer. Upon casting a film and heating above 200° C. for a long period of time, further cure was obtained and a tough resinous coating was secured.

EXAMPLE VI

Acetic anhydride (25.5 grams) was added slowly to a mixture of 46.8 grams of trimethylsiloxydiisopropoxyaluminum and 10.2 grams of triisopropoxyaluminum dissolved in 200 ml. of toluene. The reaction was exothermic and a formation of a white precipitate was observed toward the latter part of the addition. The mixture was stirred for three hours after which the isopropyl acetate and the solvent were removed. The residual material was a pale yellow viscous polymer which turned to a powdery white solid upon prolonged heating at 200° C. The highly crosslinked nature of this material was evidenced by its insolubility in the common organic solvents. This high polymer did not appreciably lose weight upon heating at 200° C. for an extended period of time.

EXAMPLE VII

Triphenylsiloxydiisopropoxyaluminum (31.5 grams) and acetic anhydride (7.65 grams) in 80 ml. of dry cumene were refluxed overnight at 130° C. The condensation product, isopropyl acetate, was removed by heating at atmospheric pressure until the vapor temperature reached 90° C. Then the flask was heated under vacuum first to 160° C. and further to 180°C. to remove the solvent, cumene. Upon cooling, the crude polymer (24.4 grams) solidified to a glassy, brittle mass. The crude product was fractionated into polymers soluble in hot cyclohexane (I), hot n-hexane (II) and cold n-hexane (III). Fraction III, which was a viscous, amber liquid at room temperature, polymerized to a solid mass on heating with an evolution of isopropyl acetate. Fractions I and II were powdery, yellow solids soluble in organic solvents and showed appreciable solution viscosities in carbon tetrachloride.

What is claimed is:

1. A process for the production of an organo siloxy substituted aluminum oxide polymer comprising reacting, by organic ester elimination, trimethyl siloxy diisopropoxy aluminum with acetic anhydride.

2. A process for the production of an organosiloxy substituted aluminum oxide polymer comprising reacting, by organic ester elimination, a mixture of trimethylsiloxy diisopropoxy aluminum and bis(trimethylsiloxy) isopropoxy aluminum with acetic anhydride.

3. A process for the production of an organo siloxy substituted aluminum oxide polymer comprising reacting, by organic ester elimination, a mixture of trimethylsiloxy diisopropoxy aluminum and triisopropoxy aluminum with acetic anhydride.

4. A process for the production of an organo siloxy substituted aluminum oxide polymer comprising reacting, by organic ester elimination, triphenylsiloxy diisopropoxy aluminum with acetic anhydride.

5. A process for the production of triorganosiloxy substituted aluminum oxide polymer comprising reacting, by organic ester elimination, a trialkylsiloxy alkoxy aluminum compound having the general formula $$R_3SiOAl(OR')_2$$

with an organic acid anhydride, wherein R and R' are hydrocarbon alkyl radicals selected from the group consisting of methyl, ethyl, propyl, butyl, amyl, and hexyl radicals.

References Cited in the file of this patent

UNITED STATES PATENTS

| 2,512,063 | Kreidl et al. | June 20, 1950 |
| 2,682,507 | Agens | June 29, 1954 |
| 2,853,504 | Jenkner | Sept. 23, 1958 |

OTHER REFERENCES

Andrianov et al.: Journal of Poly. Sci., volume XXX (1958), pages 513–524.